June 10, 1958 K. TEER 2,838,666

DETECTOR CIRCUIT FOR USE IN TELEVISION RECEIVER

Filed Dec. 2, 1955 2 Sheets-Sheet 1

INVENTOR
KEES TEER

BY Fred M. Vogel
AGENT

June 10, 1958 K. TEER 2,838,666

DETECTOR CIRCUIT FOR USE IN TELEVISION RECEIVER

Filed Dec. 2, 1955 2 Sheets-Sheet 2

INVENTOR
KEES TEER

BY Fred M. Vogel
AGENT

United States Patent Office 2,838,666

Patented June 10, 1958

2,838,666

DETECTOR CIRCUIT FOR USE IN TELEVISION RECEIVER

Kees Teer, Eindhoven, Netherlands, assignor, by mesne assignments, to North American Philips Company, Inc., New York, N. Y., a corporation of Delaware Application December 2, 1955, Serial No. 550,713

Claims priority, application Netherlands December 9, 1954

4 Claims. (Cl. 250—27)

The invention relates to a circuit arrangement for use in a television receiver to detect an auxiliary carrier wave lying within the frequency band of the television signal. Such an auxiliary carrier wave may serve for example for the transmission of a further television signal, having, as a rule, a smaller bandwith than the first-mentioned television signal. With colour television the first-mentioned signal may contain for example information about the brightness of a scenery to be reproduced and the further television signal may contain information about the colour of the scenery. If the colour television system is a three-colour system, the auxiliary carrier wave may be modulated, for a given period, by a signal relating to a first colour, for a further period by a signal relating to a second colour, for the next-following period, by a signal relating to the first colour, and so on. As an alternative, the band of the first-mentioned television signal may contain two auxiliary carrier waves, modulated each by a signal relating to the colour content of the scenery to be reproduced.

Such systems have the advantage that on the receiver side the signals having a smaller bandwidth can be regained simply by rectification, i. e. without the need of producing these auxiliary carriers at the receiver end with their correct frequencies and phases and of mixing them with the incoming auxiliary carriers.

It is known that in both cases interference occurs at the receiver end in the image produced by the signal of large bandwith, this interference being produced by the auxiliary carriers with the signals modulated thereon. If the frequency band of the first-mentioned signals has only one auxiliary carrier and the image produced by these signals has an odd number of lines in two interlaced frames, it is found that the interference of the auxiliary carrier in this image is practically not troublesome to the eye, if for example the frequency of this auxiliary carrier is chosen to be equal to an odd-numbered multiple of the line frequency. This is based on the fact that with this choice of the frequency of the auxiliary carrier the interference on a given line is suppressed for the major part during the next following scanning of this line, since the phase difference of the auxiliary carrier at two instants spaced apart by one frame period is $\pi$ radians. Strictly speaking this is only true, when the signals modulated on this auxiliary carrier do not change from frame to frame. If this variation is not excessive, this will, as is known also be the case, quite approximately, with signals not having the same shape during each frame period. Moreover, the energy of the auxiliary carrier is, as a rule, small with respect to the energy of the signal of large bandwidth.

Also if more than one auxiliary carrier is used, methods are known to minimize the effect of the interference of these auxiliary carriers in the image produced by the signal of large bandwidth.

Conversely, interference occurs in the image produced by the signal modulated on the auxiliary carrier, this interference being due to the signal of large bandwidth. It is known that the frequencies of the signal of large bandwidth, taken as sidebands of the auxiliary carrier, produce interference in the image of the signal modulated on the auxiliary carrier, this interference having the same relationship on a given line during successive scannings as the interference produced by the auxiliary carrier in the image of the signal of large bandwidth, so that, as well as the latter interference, the first-mentioned interference has little troublesome effect.

If the detection of the auxiliary carrier takes place with the aid of an auxiliary carrier produced in the receiver and having the same frequency and the correct phase (synchronous detection), the frequencies of the signal of large bandwidth will, indeed, behave as sidebands of the auxiliary carrier; this will also be the case, if the detection is performed with the aid of a diode or a different, non-linear element and if the auxiliary carrier is sufficiently large with respect to the interfering frequency of the signal of large bandwidth. However, as stated above, in general the auxiliary carrier will be kept smaller and with 100% of modulation depth of the auxiliary carrier it may even occur that for some time the auxiliary carrier is not persent at all. However, in this case the interference is constituted by a signal which is, of course, independent of the phase and the frequency of the auxiliary carrier and the said phase relationship at a given line of the image during successive scannings of this line does not occur, so that the interference will certainly have a troublesome effect.

A circuit arrangement has been suggested, which mitigates this disadvantage to a considerable extent. The auxiliary carrier with its sidebands is supplied, in this case, to a first detector driven in the forward direction, which determines one envelope of the modulated auxiliary carrier, and to a second detector driven in the forward direction, which determines the other envelope, the two envelopes being combined in a positive sense. It is found that with the use of such an arrangement the interference of the image produced by the signal modulated on the auxiliary carrier, this interference being due to the signal of large bandwidth, is materially reduced, even in the temporary absence of the auxiliary carrier.

In accordance with the invention the output signal of the bandpass filter to which the television signal is applied and which has a passband for the auxiliary carrier with its sidebands, is fed to a detector driven in the forward direction and the signal constituted by the difference between the resultant detection signal and the signal applied to the detector is fed to a further detector.

The circuit arrangement has the same advantages as the arrangement already suggested, but it may be considerably simpler.

The invention will be described more fully with reference to the figures of the drawing, in which:

Fig. 1 shows the frequency spectrum of a television signal with frequencies lying between O and $f_s$ and an auxiliary carrier lying within the frequency band of this signal, its frequency being $f_h$, the sidebands lying in between the frequencies $f_a$ and $f_b$.

The frequency $f_h$ of the auxiliary carrier is chosen to be such that the interference in the image of the signal lying between the frequencies O and $f_s$, this interference being due to the auxiliary carrier with its sidebands, is substantially imperceptible to the eye.

If the image is composed of an odd number of lines, the frequency of the auxiliary carrier may, for example, be chosen to be an odd-numbered multiple of half the line frequency.

In order to detect the signal modulated on the auxiliary carrier the television signal is fed to a bandpass filter having a pass range such that the frequencies between $f_a$ and $f_b$ can be separated out.

Figure 1:
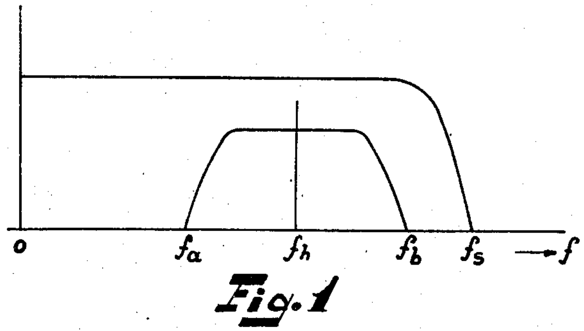
Fig. 1 illustrates a television signal with an auxiliary carrier lying in the band of the signal.

From Fig. 1 it is evident that also the frequencies of the signal lying between the frequencies O and $f_s$ within this pass range will pass through this bandpass filter. Provided that the energy of the latter frequencies is small with respect to the energy of the auxiliary carrier these frequencies, as stated above, can be considered to be sideband frequencies of this carrier, even with non-synchronous detection, and by the choice of the frequency of the auxiliary carrier the interference in the image of the signal modulated on the auxiliary carrier, this interference being due to the frequencies of the signal of large bandwidth, will also be substantially imperceptible to the eye.

However, if the auxiliary carrier is small with respect to this frequency, or if it is completely suppressed, this is no longer the case.

Figure 2:
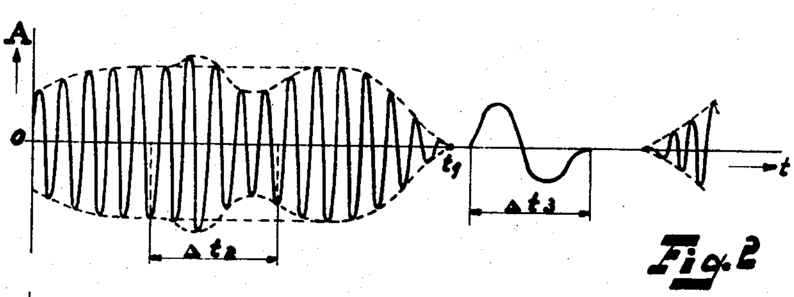
Figs. 2, 3, 4, 6, 7, and 8 show curves to explain the invention.
Figure 3:
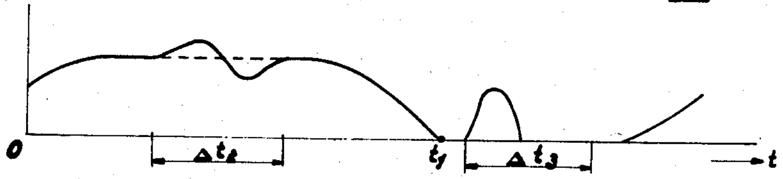

Fig. 2 shows various conditions of the output signal of the bandpass filter; the amplitude A of the signal passing the bandpass filter is plotted as a function of the time $t$. The full line designates the modulated auxiliary carrier between the instants $t=Q$ and $t=t_1$ and the broken line designates the envelope of this carrier. For $\Delta t_2$ the signal of large bandwidth is assumed to produce an interference which is small with respect to the amplitude of the auxiliary carrier and which is found to present itself as a modulation of the auxiliary carrier. For $\Delta t_3$ the interference occurs in the absence of the auxiliary carrier. If such a signal is supplied to a detector arrangement comprising a unidirectionally conductive element with the associated RC—network, it is found that a signal is produced as is shown in Fig. 3. If this signal is fed to a control-element of a television reproducing tube, it is found that the interference occurring for $\Delta t_2$ is substantially imperceptible to the eye. If the output signal of the detector is considered one frame period later, it has the shape shown in Fig. 4. T designates therein the duration of one frame period. The interference occurring for $\Delta t_2$ is, owing to the choice of the frequency of the auxiliary carrier, just opposite to an interference occurring for $\Delta(T+t_2)$. Owing to the inertia of the eye only the average of these interferences is perceived and this is just zero. However, the interferences occurring for $\Delta t_3$ and $\Delta(T+t_3)$ are not opposite and thus amplify one another. In conditions lying in between the conditions during $\Delta t_2$ and $\Delta t_3$, i. e. conditions, under which the auxiliary carrier is present when the interferences occur, but not to a sufficient extent to prevent over-modulation the interference can be split up in the detector output into two components, of which one behaves as the interference occurring for $\Delta t_2$ (which is thus compensated by an interference occurring for $\Delta(T+t_2)$) and the other as the interference occurring for $\Delta t_3$ (which is thus amplified by an interference occurring for $\Delta(T+t_3)$).

Figure 5:
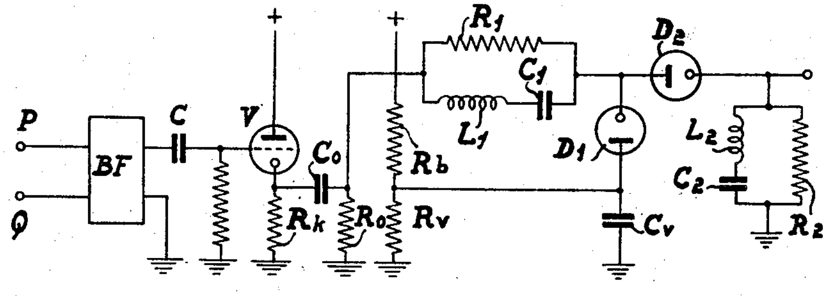
Fig. 5 shows one embodiment of a circuit arrangement according to the invention.

Fig. 5 shows one embodiment of a circuit arrangement according to the invention. The television signal shown in Fig. 1 is fed to the input terminals P and Q of the bandpass filter BF, which passes the auxiliary carrier with its sidebands. The output signal of the bandpass filter BF is fed, in the embodiment shown, first to a control-grid of an electron tube V and obtained from the cathode resistor $R_k$ of this electron tube; this cathode resistor is included by way of a decoupling network $R_o$—$C_o$ in a detector circuit, comprising a diode $D_1$ and the parallel combination of a resistor $R_1$ and a circuit $L_1$—$C_1$ tuned to the frequency of the auxiliary carrier. The anode of this diode $D_1$ is connected to earth via a network $R_v$—$C_v$. This network, which is charged through the high-ohmic resistor $R_b$, introduces into the detector circuit a positive bias voltage. It will be obvious that this network with the associated supply circuit may be replaced without objection by a battery.

It should be noted that the use of a cathode-follower as shown in the figure has the advantage that the detector circuit is fed from a signal source having a low internal impedance, which is desirable for detection with the aid of non-linear elements driven in the forward direction.

Figures 4, 6:
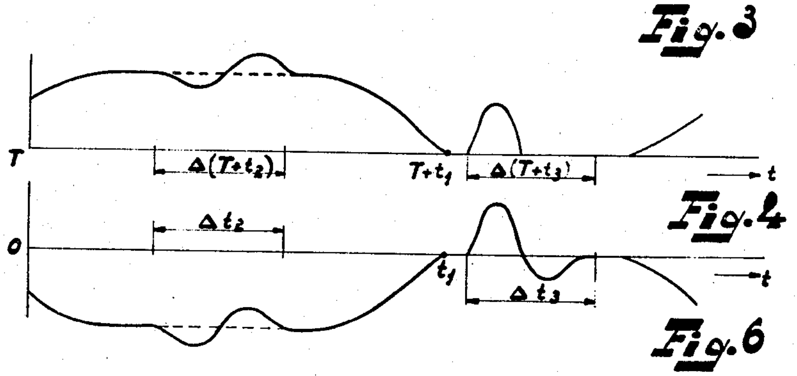

If the signal across the cathode resistor of the tube has again the shape shown in Fig. 2, the network $R_1$—$C_1$—$L_1$ will have not only the bias voltage, but also a signal as shown in Fig. 6. Owing to the bias voltage also the positive parts of the interferences operative for $\Delta t_3$ may occur across the said network, in this contradistinction to a similar detector not driven in the forward direction and having voltages occurring across such a network, and having the same waveform as shown in Fig. 3, the polarity being, however, opposite.

Figure 7:
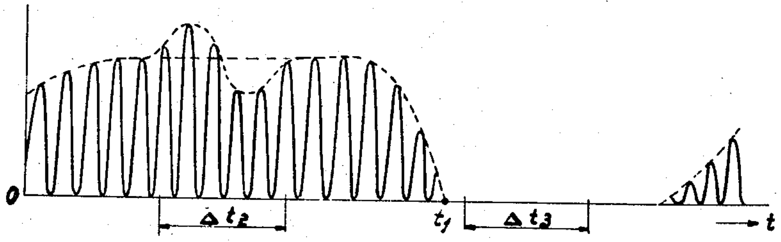

If in a negative sense the output signal of the bandpass filter or the output signal of the cathode-follower coupled with the bandpass filter, i. e. a signal as shown in Fig. 2, are combined with the resultant detection signal from the detector driven in the forward direction, i. e. with a signal as shown in Fig. 6, a signal as shown in Fig. 7 is produced. The interference occurring for $\Delta t_3$ in this signal is reduced to a considerable extent or even to zero, provided that care is taken that the interferences in the two signals to be combined should have the same strength. If the signal shown in Fig. 7 is fed to a further detector, the said interference of the output signal of this detector does not occur or is strongly reduced.

The detector circuit shown in Fig. 5, comprising the diode $D_1$ and the network $R_1$—$C_1$—$L_1$ constitutes, however, at the same time, the difference between the resultant detection signal shown in Fig. 6 and the signal fed to the detector, since across the diode $D_1$ and the network $R_v$—$C_v$ is produced a signal which, together with the signal shown in Fig. 6 and occurring across the network $R_1$—$C_1$—$L_1$, must supply the signal shown in Fig. 2, occurring across the resistance $R_o$. Consequently, the signal across the diode $D_1$ and the network $R_v$—$C_v$ has the waveform shown in Fig. 7 and does no longer contain the interference operative during $\Delta t_3$, since the latter is operative substantially completely across the network $R_1$—$C_1$—$L_1$.

Figure 8:
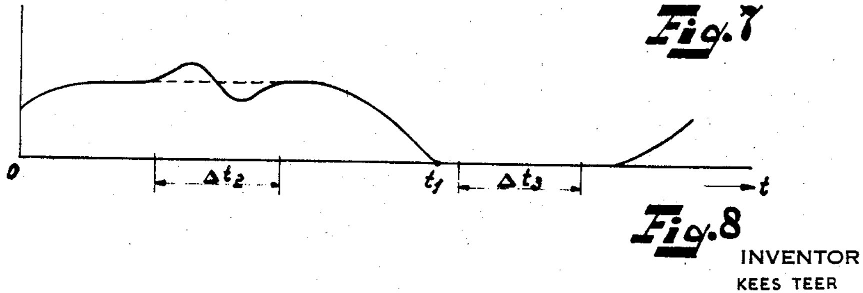

The signal occurring across the diode $D_1$ and the network $R_v$—$C_v$ is supplied to a further detector circuit comprising a diode $D_2$ and the parallel combination of a resistor $R_2$ and a circuit $L_2$—$C_2$, also tuned to the frequency of the auxiliary-carrier. The resultant detected signal occurring across the network $R_2$—$C_2$—$L_2$, as shown in Fig. 8, does neither contain the interference operative during $\Delta t_3$.

The interference occurring for $\Delta t_2$ is not suppressed, but its influence is compensated visually by an interference of opposite polarity occurring one frame period later.

It should be noted that, if a detector circuit comprises a plurality of diodes or, in general, a plurality of non-linear elements, for example a Graetz circuit, across each of these non-linear elements occurs a similar difference.

Figure 9:
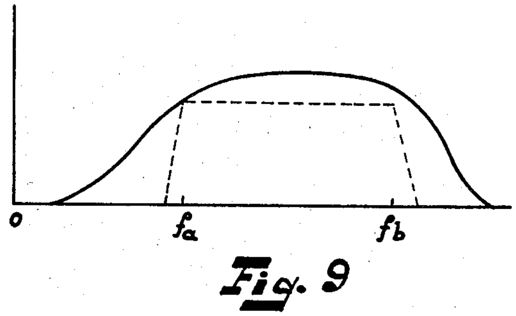
Fig. 9 shows characteristic curves of bandpass filters to be used in accordance with the invention.

It is found by experiments that the operation of a circuit arrangement according to the invention is affected adversely by bandpass filters BF having sharp cut-off frequencies. A bandpass filter having a pass characteristic curve as shown in Fig. 9 by broken lines yields materially better results with the circuit according to the invention than with a simple detector, but for particular structures of the signal of large bandwidth, skilled observers can still perceive interference in the image of the signal modulated on the auxiliary carrier. This interference is found to vanish substantially completely, if use is made of a bandpass filter having a pass characteristic curve as shown in Fig. 9 by full lines, in which especially the cut-off of the low-frequency side is preferably very gradual. If the coupling capacitor C is constituted by a capacitor of comparatively low capacity, the band-pass filter BF may, if desired, be completely omitted.

It should be noted that it is of course not necessary to use diodes as non-linear elements. It is, however, desirable that in the first detector both positive and negative parts of the interferences should be followed, i. e. no use can be made of rectifiers without bias voltage.

It should be noted that the use of a $L_1$—$C_1$ circuit and an $L_2$—$C_2$ circuit in the arrangement shown in Fig. 5, instead of using a capacity, is to be preferred on account of the fact that the highest modulation frequency of the auxiliary carrier ($f_h - f_a$ or $f_b - f_h$) is not very small with respect to the frequency $f_h$ of the auxiliary carrier. With a suitable choice of $L_1$—$C_1$ and $L_2$—$C_1$ the low band-pass filter used after the detector may, if desired, be completely omitted.

What is claimed is:

1. A detector circuit for detecting an auxiliary-carrier signal having amplitude modulation and lying within the frequency band of a main signal, comprising a band-pass filter having a bandpass for said auxiliary-carrier and its sidebands, means for feeding said signals to said filter, a first detector coupled to receive the output signal of said filter and biased to be normally conductive for said output signal so as to be driven in the forward direction thereby providing a detected signal, a second detector, means for applying to said second detector a composite signal comprising the difference between said detected signal and the output signal of said filter, said second detector being biased to be normally conductive for said composite signal thereby providing a detected composite signal, and means connected to the output of said second detector to derive said detected composite signal therefrom.

2. A detector circuit as claimed in claim 1, in which said first detector includes a non-linear element connected in the output circuit thereof, and means for supplying to said second detector the signal which occurs across said non-linear element.

3. A detector circuit as claimed in claim 1, in which said bandpass filter has a characteristic curve which has a more gradual slope for the lower-frequency sideband of said auxiliary-carrier signal than for the higher-frequency sideband of said auxiliary-carrier signal.

4. A detector circuit as claimed in claim 1, in which said first detector comprises a positively biased unidirectionally conductive element.

References Cited in the file of this patent

UNITED STATES PATENTS

| | | |
|---|---|---|
| 2,329,877 | Cawein | Sept. 21, 1943 |
| 2,514,859 | Griffin et al. | July 11, 1950 |
| 2,562,216 | Schlesinger | July 31, 1950 |
| 2,679,584 | MacDonald | May 25, 1954 |